Dec. 28, 1965    C. T. THOMPSON    3,225,841
DRILLING APPARATUS

Filed Aug. 31, 1962    5 Sheets-Sheet 2

INVENTOR:
CHARLES T. THOMPSON
BY
AGENT

Dec. 28, 1965   C. T. THOMPSON   3,225,841
DRILLING APPARATUS

Filed Aug. 31, 1962   5 Sheets-Sheet 3

INVENTOR:
CHARLES T. THOMPSON
BY *Louis Pazzanell*
AGENT

United States Patent Office 3,225,841
Patented Dec. 28, 1965

3,225,841
DRILLING APPARATUS
Charles T. Thompson, Claremont, N.H., assignor to Joy Manufacturing Company, Pittsburgh, Pa., a corporation of Pennsylvania
Filed Aug. 31, 1962, Ser. No. 220,682
5 Claims. (Cl. 173—15)

This invention relates to a drilling apparatus and more particularly to a downhole drill actuating mechanism which increases the energy delivered to the drilling tool and having improved hole cleaning ability.

The paramount problems associated with the apparatus of this nature involves the transmission of a maximum amount of energy to the drill bit and quickly remove the cuttings generated from the hole formed by the drilling action.

The correlation of the structure of this invention is directed to solve such problems in a novel manner by providing a relatively heavy reciprocable hammer piston which is rectilinearly reciprocable in a generally tubular body with means incorporated therein for accumulating the fluid displaced by the hammer piston during movement thereof toward the drill bit which fluid is in turn utilized to assist in moving the hammer piston away from the drill bit and remove the cutting from the hole being formed.

Other aspects of this invention provide a novel cooperation of the drill bit and certain pressure fluid passageways, in the drill body, with the attendant result that reciprocation of the hammer piston is discontinued when the drill string is raised a predetermined amount thus avoiding damage to the drill body and simultaneously therewith pressure fluid at substantially line pressure is directed in the drilled hole for cleaning.

Other advantages are derived from the structure of this invention which will be particularly pointed out hereinafter.

Accordingly, one object of this invention is to provide a new and improved drilling apparatus.

Another object of this invention is to provide a new and improved drilling apparatus having fluid passageways connected directly to the supply of pressure fluid for conducting pressure fluid at substantially supply pressure to the periphery of the hole being formed.

A further object of this invention is to provide a new and improved drilling apparatus which utilizes exhaust air in conjunction with the line pressure air for cleaning the hole being formed.

An additional object of this invention is to provide a new and improved drilling apparatus which maximizes the energy delivered to the drill bit.

Another object of this invention is to provide a new and improved drilling apparatus having means for automatically interrupting the normal working stroke when the drill string is withdrawn from the working face a predetermined amount.

Another object of this invention is to provide a new and improved drilling apparatus having a series of longitudinally extending passageways which cooperate with a hammer piston and a drill bit to maximize the energy delivered to the drill bit and interrupt the normal working stroke of the apparatus without disconnecting the pressure fluid supply.

These and other objects and advantages of this invention will become more apparent when taken in conjunction with the following drawings in which.

Figure 15:
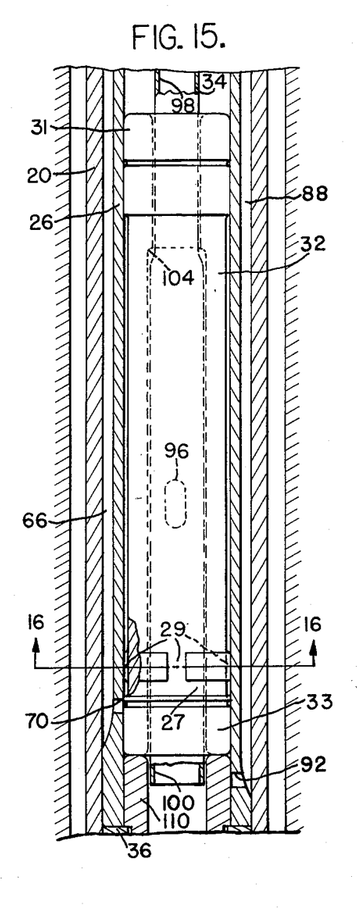
FIG. 15 is a partial longitudinal cross section of the drilling apparatus showing a circumferential groove communicating with circumferentially spaced longitudinal grooves formed in the forward bearing portion of the hammer piston.
Figure 16:
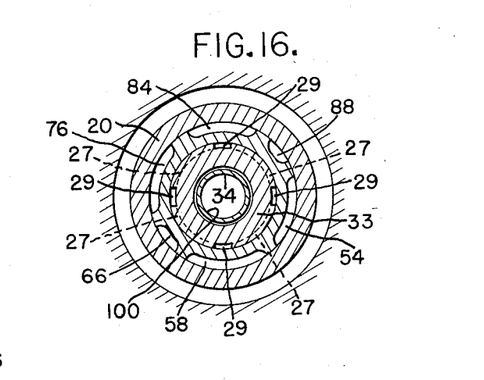
FIG. 16 is a cross sectional view of FIG. 15 taken substantially along the line 16—16.

Referring now to FIGS. 1A-1B, 2A-2B, and 3A-3B a drilling apparatus constructed according to the principles of this invention is shown and the main components thereof include an elongated tubular casing 20 being internally threaded at the opposite ends thereof as shown. A tubular chuck 22, having threads on the outer surface thereof, is threadedly engaged at the forward end of the casing 20 and the interior surfaces thereof are provided with longitudinal splines 23 for slidably receiving cooperating longitudinal splines 25 formed on a suitable drilling bit 28. A generally tubular back head 24 has a threaded portion threadedly secured to the rearward end of the tubular casing 20 and is adapted to be connected to the drill string in a manner conventional in the art. Located in the casing 20 between the chuck 22 and the back head 24 is an elongated tubular sleeve 26 within which is slidably disposed an elongated tubular hammer piston 32 having a stepped bore hereinafter to be more particularly described. The tubular sleeve 26 is shrink fitted in the casing 20 so that relative axial movement between the casing 20 and the sleeve 26 is obviated. The hammer piston 32 includes, as shown, spaced land portions 31 and 33. The forward land 33 has a circumferential groove 27 formed therein and circumferentially spaced longitudinally extending slots 29, communicating with the groove 27 and the undercut portion of the hammer piston 32 (see FIGS. 15 and 16). The purpose of the groove 27 and the slots 29 will be set forth in the description of the operation of this invention. A conventional flapper type valve body 30 is located between the back head 24 and the tubular sleeve 26. The valve body 30 includes means, to be particularly described, operable, in response to the reciprocation of the piston 32, to selectively admit pressure fluid interiorly of the drilling device for causing reciprocation of the hammer piston 32 in the sleeve 26. Extending through, and centrally of the valve 30, a stem 35 is provided having slidably secured at the rearward end thereof a spring biased check valve 38 which admits pressure fluid to the drilling device when line air is turned on. At the forward end of the stem 35 an elongated stepped tube 34 is provided extending through the tubular piston 32 and slidably fitted at its forward portion to the drill bit 28 as shown. An annular retainer ring 36 is suitably captively secured in the casing 20 and is in abutting engagement with the end of the sleeve 26.

In particular the valve 30 includes axially spaced body members 40 and 42 being held in such axial alignment by a tubular spacer member 44 so that when assembled as shown an annular cavity 46 is formed between the members 40 and 42. An annular washer like plate 48 is located in the cavity 46 and is arranged, on a tubular sleeve 47 fitted on the central stem 35 to rock in the cavity 46. Such a plate 48 is generally referred to as a flapper valve. The rearwardmost member 40 includes circumferentially spaced axially extending ports 50 which permit the flow of pressure fluid from the supply into the cavity 46 whenever the check valve 38 is depressed as shown more particularly in FIG. 2A. The forward body member 42 includes circumferentially spaced axially extending discharge ports 51 and 52 which in conjunction with the operation of the flapper 48 selectively supply pressure fluid to diametrically opposed non-communicating openings 53 and 55. Ports 57 and 59 connect certain passageways in sleeve 26, to be hereinafter described, with the openings 53 and 55 respectively.

The sleeve 26, as shown in FIGS. 4–10, has a series of longitudinally extending circumferentially spaced fluid passageways of different lengths and of different widths to conduct pressure fluid from the supply of pressure fluid to the interior of the casing 20 so that actuation of the drilling apparatus is effected in accordance with the principles of this invention. More particularly the sleeve 26 has a front supply passageway 54, in communication with the port 52 through the port 59, the opening 55 and a port 56 to supply pressure fluid to the forward face of the hammer piston 32. The various passageways shown in FIGS. 4–10 will be individually described in clockwise order starting from the passageway 54 hereinabove described. Their coaction with other elements of this invention will however be particularly set forth in the description of the operation of the drilling apparatus.

Figures 2A, 3A:
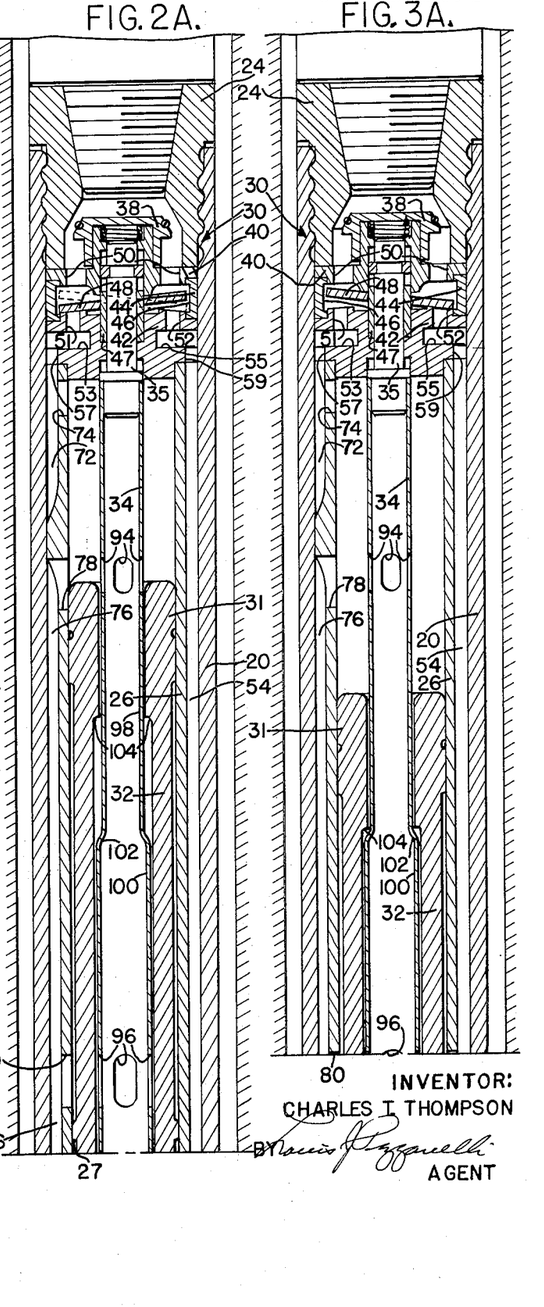
FIGS. 2A and 2B are longitudinal cross sectional views similar to FIGS. 1A and 1B showing the hammer piston in abutting engagement with the anvil portion of the drilling bit.
FIGS. 3A and 3B are longitudinal cross sectional views of the drill with the reciprocation of the hammer piston being interrupted due to partial withdrawal of the drilling apparatus from the hole.
Figure 2B:
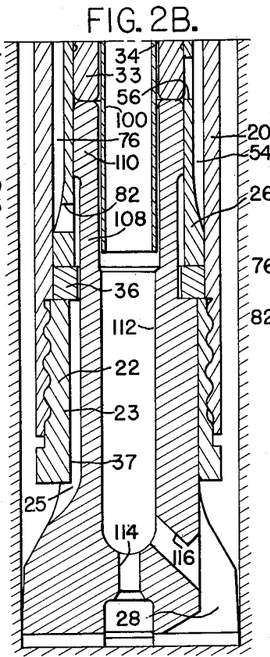
Figure 6:
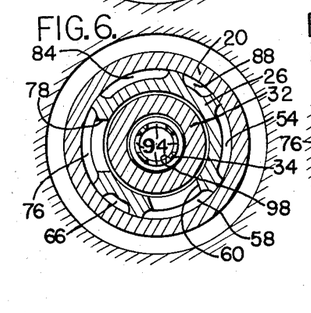
FIG. 6 is a cross sectional view of FIG. 1A taken substantially along the line 6—6.
Figure 7:
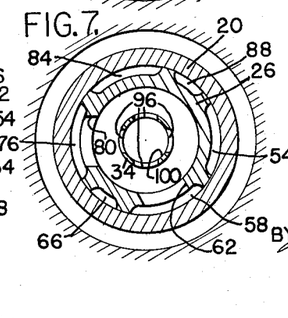
FIG. 7 is a cross sectional view of FIG. 1A taken substantially along the line 7—7.
Figure 8:
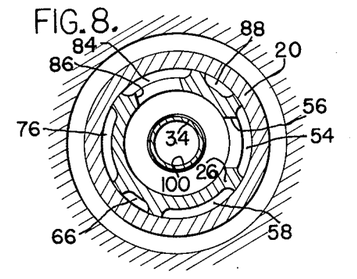
FIG. 8 is a cross sectional view of FIG. 1B taken substantially along the line 8—8.
Figure 9:
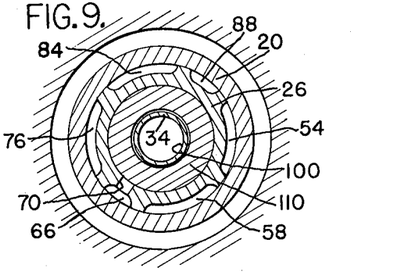
FIG. 9 is a cross sectional view of FIG. 1B taken substantially along the line 9—9.
Figure 10:
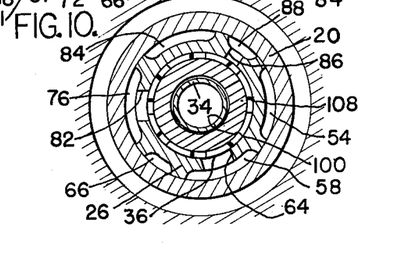
FIG. 10 is a cross sectional view of FIG. 1B taken substantially along the line 10—10.

As shown in FIG. 6 an elongated exhaust passageway 58 is provided, being circumferentially adjacent the front supply passageway 54 and having three longitudinally spaced ports 60, 62 and 64 extending through the sleeve 26. Pressure fluid admitted to the space between the valve 30 and the rearward face of the hammer piston 32 for moving the hammer piston 32 toward the bit 28, is exhausted through the port 60 when the hammer piston has traveled a sufficient distance to uncover the port 60 (FIGS. 2A–2B). An intermediate port 62 permits exhaust of pressure fluid located between the forward face of the piston and the anvil portion of the bit 28 when uncovered by the piston 32. Whenever the flow of pressure fluid is through the port 60 or 62 the pressure fluid is conducted down passageway 58 to forwardmost port 64 discharging the air in the space between the shank of the bit 28 and the sleeve 26 down through the splines 23 and 25 to the periphery of the bit 28. Continuing clockwise a longitudinal stop passageway 66 is provided having longitudinally spaced ports 68 and 70 therein with the port 68 being in direct communication with the supply of the pressure fluid thereby shunting the valve 30. The flow of pressure fluid at line pressure through the port 68 down the passageway 66 and through the port 70 functions to interrupt the normal working stroke of the hammer piston 32 whenever the drill string is withdrawn from the hole a predetermined amount. During normal operation the port 70 is closed. A flow metering device such as an orifice or an adjustable throttling device 91 is provided so that the flow in passageway 66 can be regulated to meet selected drilling conditions. The presence or absence of the throttling device is optional however. Adjacent the passageway 66 two longitudinally aligned non-communicating passageways are formed in the sleeve 26. The first of such passageways 72 supplies pressure fluid, passing through the valve 30, through a port 74 to the cavity between the valve 30 and the rearward face of the hammer piston 32. The second of such longitudinally aligned passageways 76 has three longitudinally spaced ports the rearwardmost of which is designated by 78, the intermediate port by 80, and the forward port by 82. Ports 78 and 80 are operative to permits exhausting of the pressure fluid, during rearward and forward reciprocation of the hammer respectively, down the passageway 76 and through the port 82 to also supply cleaning air to the periphery of the bit 28 in the same manner as, and to supplement the flow from, port 64. Another longitudinally extending passageway 84 is formed in the sleeve 26 and it includes a single port 86 which connects the interior of sleeve 26 with the interior of the casing 20. The passageway 84 serves to store the fluid located between the forward face of the hammer 32 and the anvil portion of the bit 28 during the forward working stroke of the piston 32. The provision of such a longitudinal passageway for storing the fluid, which is gradually pressurized by the downward movement of the hammer piston 32, not only increases the energy transferred to the drilling bit 28 but also reduces the amount of pressure fluid from the supply which must be provided for moving the hammer 32 rearwardly. A final longitudinally extending fluid passageway 88 having a rearwardly located port 90, is selectively connectible by way of another throttling device 91, to the supply of pressure fluid. Passageway 88 conducts pressure fluid at substantially line pressure to a port 92 (see FIG. 15), located at the forward end of the passageway, with the pressure fluid being supplied down and around the periphery of the bit 28 when the valve 91 is open. As distinguished from exhausts, ports 60, 62, 78 and 80, which supply peripheral exhaust during normal working of the hammer 32, the exhaust flow through port 92 is responsive to the valve 91.

Referring now more particularly to the stepped tube 34 it will be noted by inspection of FIGS. 1A, 2A and 3A–3B that pluralities of rearward and forward openings 94 and 96 respectively, are formed therein. The openings 94 are provided for discharging the pressure fluid between the valve body 30 and the rearward face of the hammer piston 32 down the stepped tube 34 when the hammer piston has moved a sufficient distance toward the anvil portion of the drill bit 28, and during such movement the rearward end of the hammer piston uncovers the ports 94 allowing the pressure fluid to be discharged down the stepped tube 34 through the openings 94. In an analogous manner the pressure fluid supplied by passageway 54 and port 56 for driving the hammer piston 32 rearwardly, is exhausted through the openings 96 and down the stepped tube 34 when the hammer piston 32 is moved rearwardly a sufficient amount so that the forward face of the hammer piston uncovers the openings 96. Thus during the retraction and power stroke, rearward and forward movement respectively, of the hammer piston 32 a portion of the pressure fluid supplied to the opposite ends of the hammer piston is selectively discharged down the center tube 34 with the remaining portion being exhausted to the periphery of the bit 28.

Figure 1A:
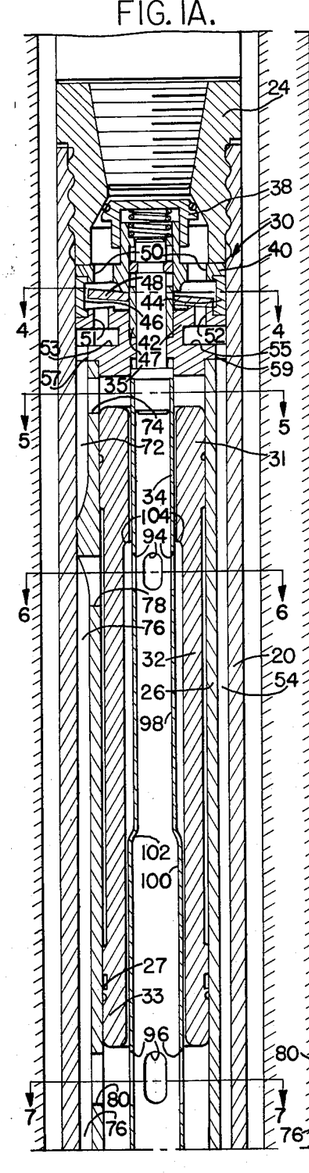
FIGS. 1A and 1B are longitudinal cross sectional views of the drilling apparatus constructed in accordance with the principles of this invention with the hammer piston being conditioned to deliver a blow to the bit.
Figure 1B:
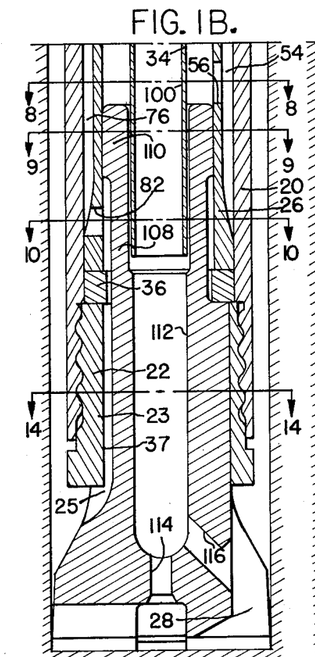

By inspection of FIGS. 1A, 2A and 3A it will be noted that the tube 34 is stepped, with such steps being designated by numerals 98 and 100, respectively, the smaller and large tube portions. A shoulder 102 blending the steps 98 and 100 is provided for engaging a cooperating shoulder 104 formed by the stepped bore in the hammer piston 32. The shoulders 102 and 104 are provided for retaining the hammer piston 32 within the sleeve 26 whenever the drilling apparatus is withdrawn from the hole for changing the drill bit 28. In this event removal of the bit permits the hammer piston to slide downwardly until the shoulders 102 and 104 come in contact.

Figure 14:
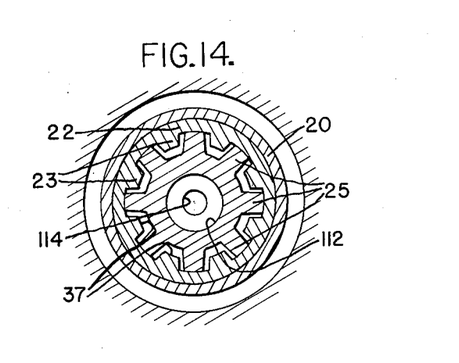
FIG. 14 is a cross sectional view of the spline connection of the drill bit taken substantially along the line 14—14 of FIG. 1B.

Now referring more particularly to the drilling bit 28 it will be noted by reference to FIG. 14 that a portion of the shank of the bit has longitudinally extending circumferentially spaced splines 25 slidably fitted in splines 23 formed in the chuck member 22 so that rotational movement applied to the drill string is transmitted from the casing 20, to the chuck member 22 and to the drilling bit 28 through the splines 23 and 25. Also note that the splines 23 and 25 are formed of substantially different radial lengths to form circumferentially spaced passageways 37 through which the above mentioned peripheral exhaust flows down and around the bit 28. Rearwardly of the splines 25 the drilling bit 28 includes an undercut portion 108 having an outside diameter less than the internal diameter of the annular retaining ring 36 to allow slidable movement of the bit 28 relative to the sleeve 26 through the bore of the annular retaining ring 36. On the rearwardmost portion of the drilling bit 28 an anvil 110 is formed having a diameter relatively greater than the undercut portion 108 and greater than the internal diameter of the retainer ring 36. The rearward face of the anvil portion 110 is adapted to receive the force imparted thereto by the downward reciprocation of the hammer piston 32. A bore 112 is formed centrally of the drilling bit 28 and is slidably fitted over the central tube 34 as shown and a central axially extending passageway 114 connecting the bore 112 with the exterior of the bit. The passageway 114 conducts the pressure fluid, derived from the central tube 34, to the face being drilled. In addition to passageway 114 a plurality of circumferentially spaced downwardly and outwardly diverging passageways 116 connect the bore 112 and the outer side periphery of the bit 28 so that pressure fluid discharged through passageways 116 removes the cuttings from the hole being formed.

The axially extending outer surface of the anvil portion 110 cooperates with the fluid passageways 58, 66, 76 and 88 by fulfilling the functions of a valve. When the drilling apparatus of this invention is lowered into the hole it has formed as shown in FIGS. 1A and 2A the drill bit 28 is retracted into the drill body until the shoulder forming the transition surface between the splines 25 and the undercut portion 108 engages the lower annular surface of the bit retainer 36. In this position the anvil portion 110 is correspondingly retracted into the sleeve 26 blocking the port 70 in the passageway 66. Also while in this position the ports 64 in passageway 58, port 82 in passageway 76 and port 92 in passageway 88 are open resulting in the flow of pressure fluid in the passageways 58, 76 and 88. It is to be noted however, that valve 91 must be open to cause flow of pressure fluid in passageway 88.

Figure 3B:
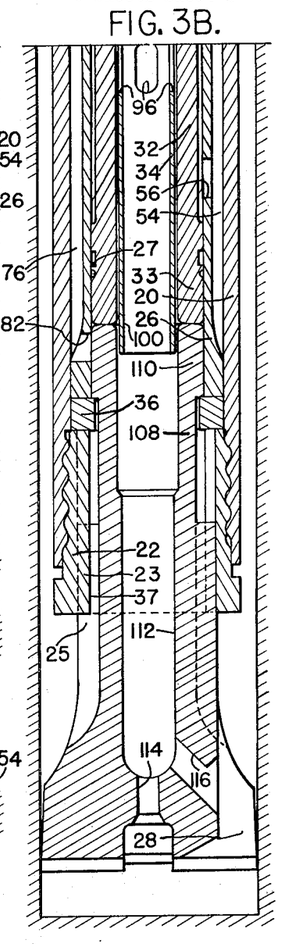
Figure 4:
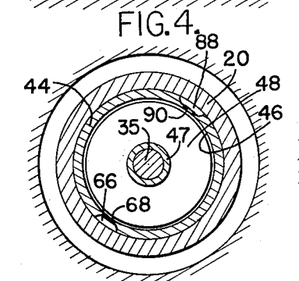
FIG. 4 is a cross sectional view taken substantially along the line 4—4 of FIG. 1A.
Figure 5:
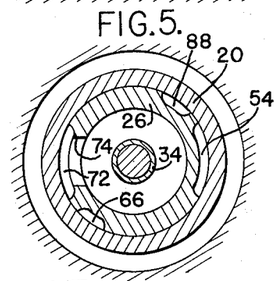
FIG. 5 is a cross sectional view of FIG. 1A taken substantially along the line 5—5.

When the drilling tool is retracted from the working face as shown in FIGS. 3A–3B the drill bit 28 slides forward until the shoulder between the anvil portion 110 and the undercut portion 108 on the bit 28 engages the upper annular surface of the annular retainer 36 (see FIG. 3B). In this position the port 70 is open and ports 64, 82 and 92 are closed resulting in no flow of fluid in passageways 58, 76 and 88 respectively. Under all circumstances, however, the ports 56 and 86 in passageways 54 and 84 respectively, remain open irrespective of the position of the drill bit 28.

Figure 11:
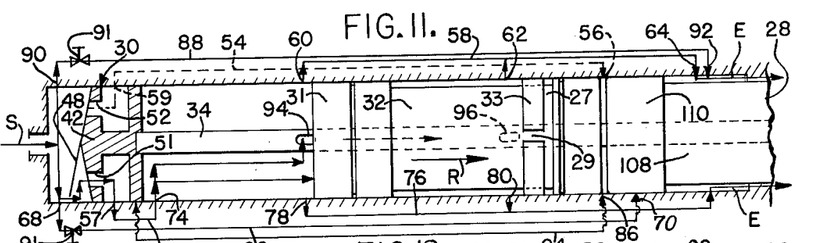
FIG. 11 is a schematic representation of the drilling apparatus showing the direction of flow of the fluid in all of the passageways in such apparatus when the hammer piston is about to strike the drilling tool.
Figure 12:
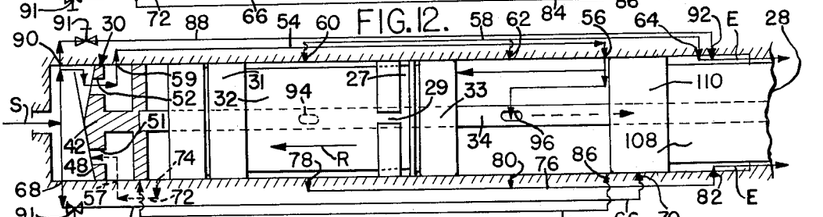
FIG. 12 is a schematic representation similar to FIG. 11 showing the flow of fluid in the passageways during retraction of the hammer piston.
Figure 13:
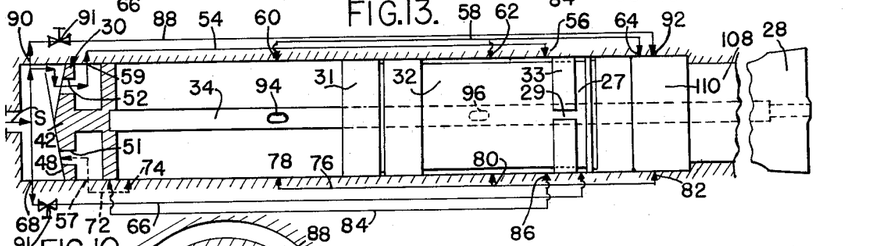
FIG. 13 is a schematic representation similar to FIG. 11 showing the direction of fluid flow in the passageways when the drill bit is out of contact with the bottom of the hole formed thereby.

In describing the operation of this invention, reference is made to FIGS. 11, 12 and 13 which show all of the fluid passageways and ports rotated into the plane of the paper. Referring particularly to FIG. 11 the supply of pressure fluid is designated by the arrow S; the direction of movement of the hammer piston 32 is designated with the arrow R; and the drill bit 28 is illustrated in its fully retracted position. The hammer piston 32 is shown in the position immediately prior to its striking of the anvil 110 and when in this position the valve 48 is rocked so that the passageway 52 in the valve body 30 is closed to the supply of pressure fluid. The ports 51 and 57 allow the flow of pressure fluid through the passageway 72 through the port 74 into the space bounded by the sleeve 26, the valve 30 and the left end, as viewed in FIG. 11, of the hammer piston 32. Fluid pressure supplied to this space acts against the left face of the hammer moving the hammer 32 to the right as indicated by arrow R. As the hammer piston 32 travels toward the bit, ports 94 in the center tube 34 and ports 60 and 78, are uncovered simultaneously by the hammer piston 32 causing the air confined in such space to be exhausted down the center tube 34 and down the exhaust passageways 58 and 76. The pressure fluid of reduced pressure is exhausted in passageways 58 and 76, passes through ports 644 and 82 respectively and thereafter discharged to the periphery of the bit 28 as shown by the arrows E. Since the blow passageway 88 is connected directly to the supply of pressure fluid a constant supply of pressure fluid at line pressure may be conducted through passageway 88 through the port 92 as shown by the arrow E when the valve 91 is open. No flow of pressure fluid occurs in passageway 66 since the port 70 is blocked by the anvil portion 110. During movement of the hammer piston 32 toward the anvil 110 a part of the fluid located between the left face of the anvil 110 and right hand face of the hammer piston 32 flows through port 86 into the compression passageway 84 and is accumulated there under pressure. The remaining part of the fluid between the face of the anvil portion 110 and the forward face of the hammer piston 32 flows through port 56 rearwardly in passageway 54 through port 59 and pressurizes the portion of flapper 48 covering the port 52. At this instant the flapper 48 is rocked to close port 51 and open port 52 to the supply of pressure fluid. The pressure fluid at supply pressure flows through port 52, as shown in FIG. 12, through the port 59 down passageway 54 through port 56 supplying a pressure fluid to the right hand face of the hammer piston 32. The pressure fluid supplied to that face of the hammer piston 32 drives it backwardly as shown by the arrow R in FIG. 12. The rearward movement of the hammer piston 32 closes ports 94, 78 and 60 and opens, after a sufficient amount of rearward movement, ports 96 in the center tube 34 and ports 62 and 80, formed through the sleeve 26. Opening of the ports 62, 80 and 96 allows the pressure fluid between the anvil 110 and the right hand face of the hammer piston 32 to flow through the ports 62, 80 and 96 into and down the passageways 58 and 76 and down the center tube 34 respectively supplying central and peripheral air for cleaning of the bore hole. As the hammer piston 32 approaches the valve body 30 the fluid confined between the left hand face of the hammer piston 32 and the valve body 30 flows through port 74 in passageway 72 through port 57 and supplies pressure to the portion of the flapper 48 covering the passageway 51. Such pressure is sufficient to cause rocking movement of the flapper 48 to close port 52 and open port 51 and thus repeat the above described operation. It is to be appreciated that the described operation of the flapper valve 48 does not preclude the influence of current action in addition to the reciprocation of the hammer piston 32 for its operation.

It is to be noted that the pressure fluid accumulated in passageway 84 through the port 86 during the forward movement of the hammer piston 32 is operative to assist the pressure fluid, communicated through passageway 54 and port 56, to move the hammer piston 32 rearwardly after the anvil 110 has been struck. The pressure fluid in passageway 84 also provides a force acting in opposition to the gravitational force and the force acting on the rearward face of the hammer piston 32, derived from the pressure fluid admitter through port 74. Such a force may be characterized as a variable pressure air cushion giving rise to a force having a maximum value at the instant the hammer piston 32 strikes the anvil 110. In this manner the impact of the hammer piston 32 against the anvil is optimized so that a maximum amount of energy is transferred to the bit 28 without causing damage thereto.

When the drilling apparatus is withdrawn from the hole a sufficient amount to allow the drill bit 28 to slide forwardly and have the rearward undercut portion of the anvil resting against the annular retainer ring 36, as shown in FIGS. 3A–3B, the ports 64, 82 and 92 are closed as shown in FIG. 13 and the port 70 in passageway 66 is open. Assuming the valve 91 is open the passageway 66 is in direct communication with the supply of pressure fluid through the port 68 thus pressure fluid at supply pressure is communicated to passageway 66 when the bit 28 is in the described position. Fluid pressure at line pressure through the port 70 is operative to immediately interrupt the reciprocation of the hammer piston 32 on the down stroke thereof and precharges the passageway 84, through port 86 which is open, out the passageway 54 through port 56. Precharging of the passageway 54 causes pressurization of that portion of the flapper valve 48 covering the port 52 which rocks the flapper valve 48 to open port 52 and close port 51. The hammer piston 32 comes to rest on the anvil 110 (FIG. 13). Pressure fluid at substantially line pressure flows through port 52, 59, passageway 54, port 56 around the undercut portion of the outer periphery of the hammer piston 32, through ports 62 and 80, rearwardly in passageways 58 and 76, and down the center tube 34 through ports 94. At the same time pressure fluid from the supply flows through port 68, forwardly in passageway 66, through port 70 in the circumferential groove 27, rearwardly in the longitudinal slots 29, rearwardly in passageways 58 and 76, through the ports 60 and 78 and down the center tube 34 through the ports 94. It has been determined that the pressure fluid derived from passageway 66 increases the exhaust flow approximately twelve percent when the pressure of the pressure fluid supply is 100 p.s.i.g. and flow areas of optimum size. It will be understood, however, that the percentage of additional exhaust flow could be adjusted to a greater or lesser percentage.

Figure 17:
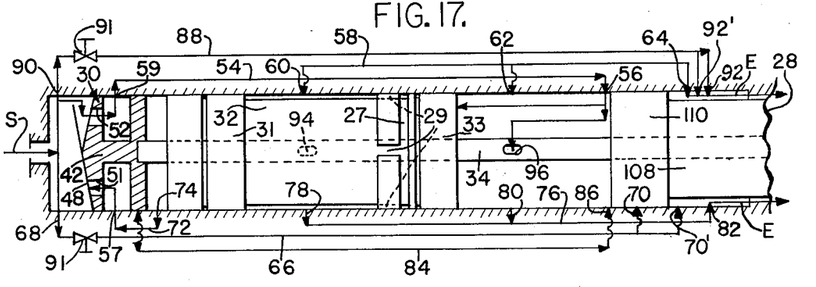
FIG. 17 is a diagrammatic representation of a first modification of the drilling apparatus showing a construction which increases the amount of fluid discharged exteriorly and around the drilling bit.
Figure 18:
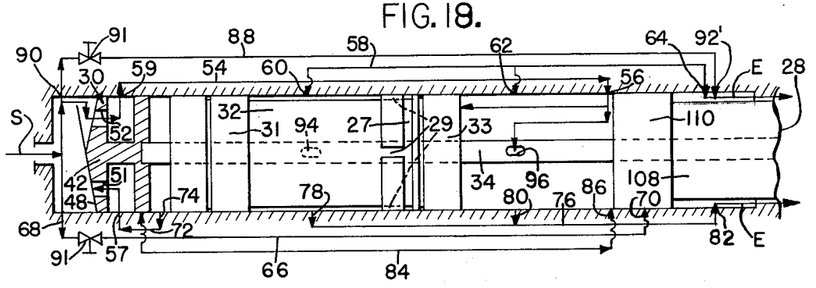
FIG. 18 is a diagrammatic representation of a second modification of the drilling apparatus having a reduced number of blow ports.

The diagrammatic representations of FIGS. 17 and 18 show various modifications of this invention which may be made without departing from the principles of this invention.

The modification of FIG. 17 shows the passageways 66 and 88 to include additional ports 70' and 92' respectively which are located to be cooperable with the position of the anvil 110. The described operation of the drill would remain the same with the exception that passageways 66 and 88 would both permit the flow of pressure fluid through ports 70' and 92' during the drilling function with such flow being directed through the splines 23 and 25 to the periphery of the bit 28. In the event the drilling apparatus is positioned to allow the bit 28 to slide forwardly and close ports 82, 70', 64 and 92 with the hammer piston 32 coming to rest on the anvil 110, and opening ports 70 and 92', pressure fluid from the supply flows forwardly in passageways 66 and 88 through ports 70 and 92', into the groove 27, through the slots 29, around the undercut portion of the hammer piston 32 through the ports 78 and 60 and down the center tube 34, through the ports 94. Thus pressure fluid at substantially line pressure is delivered through the center of the bit 28 for cleaning the hole being formed.

By providing the additional ports 70' and 92' the amount of cleansing air delivered to the working surface during normal operation and blowing respectively is approximately doubled thus insuring adequate cleaning capacity when desired.

The second modification involves the elimination of ports 70' and 92 in passageways 66 and 88 respectively. Such a construction approximately doubles the amount of center tube exhaust, at substantially line pressure, when the bit 28 moves forwardly to uncover ports 70 and 92'. Air from the supply enters ports 68 and 90, flows forwardly in passageways 66 and 88, through ports 70 and 92' respectively. By virtue of the groove 27 and the slots 29 the pressure fluid flows past the undercut portion of hammer 32 into the ports 62 and 80 (in passageways 58 and 76 respectively), rearwardly in the passageways 58 and 76, through the ports 60 and 78, and down the center tube 34, through the ports 94 to and through the bit 28. It is to be appreciated that this modification does not provide the steady peripheral exhaust at substantially line pressure during normal operation of the drilling apparatus but only the pulsating peripheral exhaust during such operation is maintained.

Figure 19:
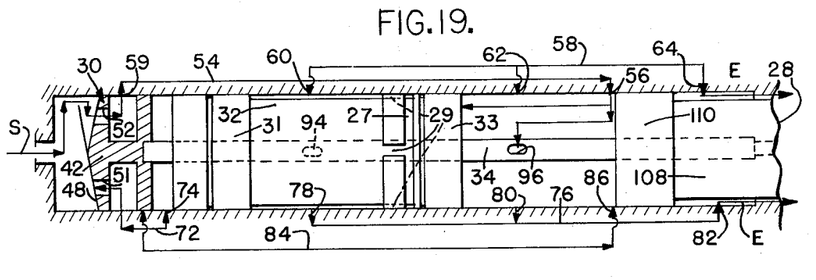
FIG. 19 is a diagrammatic representation of a third modification of the drilling apparatus having certain fluid passageways and the attendant ports eliminated.

A third modification which may be readily incorporated in the disclosed structure without departing from the principles of this invention concerns the elimination of passageways 66 and 88. Such a modification alters the operation of the drilling apparatus by no longer having pressure fluid at substantially supply pressure to immediately interrupt the working stroke of the hammer piston 32 (stop passageway 66) when the bit 28 has dropped to its forward limiting position and no steadily flowing pressure fluid is supplied around the periphery of the bit 28 during normal operation.

Under these circumstances the apparatus operates in the following manner. When drilling, pressure fluid is supplied through the valve 30, through the ports 55 and 74, through the passageways 54 and 72 for reciprocating the hammer piston 32 rearwardly and forwardly respectively in the manner more particularly described in the preferred embodiment. When the hammer piston has moved rearwardly a sufficient distance exhaust flow of the working fluid occurs through the ports 62 and 80, forwardly in the passageways 58 and 76, through the ports 82 and 64, and around the periphery of the bit 28 by way of the spline-formed passageways. Concurrently threwith exhaust flow through the center of the bit 28 is derived from the center tube 34 through the ports 96. Thus according to this embodiment dual exhaust, viz., through the center and around the periphery of the bit 28, is pulsating with the frequency of the pulsation being determined by reciprocating rate of the hammer 32.

In similar vein pulsating dual exhaust takes place when the hammer 32 has moved forwardly a sufficient distance to uncover ports 60, 78 and 94 allowing the fluid utilized to move the hammer 32 toward bit 28 to be exhausted to the periphery of the bit 28 through passageways 60 and 78 and through the ports 64 and 82, respectively, with exhaust to the center of the bit 28 being derived through the ports 94 forwardly down the center tube 34.

Having described a preferred embodiment and modifications of this invention in accordance with the patent statutes, it is to be realized that modifications thereof may be made without departing from the spirit of this invention. Accordingly it is respectfully requested that this invention be interpreted as broadly as possible and be limited only by the prior art.

What I claim is:

1. A down-the-hole drilling device for forming holes in geological formations comprising, an elongated tubular body, a drilling element captively slidably carried at one end of said body, valve means carried at the other end of said body, elongated hammer means in and slidably engaging the interior of said body and being reciprocable between alternate terminal positions intermediate said drilling element and said valve means, a plurality of fluid passageways in said body communicable with said valve means, said valve means being operable to alternately supply pressure fluid to interior spaces within said body with opposite ends of said spaces being defined by opposite longitudinally spaced surfaces of said hammer means for reciprocating said hammer means in said body, ported passageway means for exhausting pressure fluid from said interior spaces alternately said hammer means having an axial bore therethrough, internal and external fluid passageway means through and around said drilling element respectively to form a dual fluid exhaust path extending longitudinally of said body, elongated tubular means extending axially from said drilling element and slideably received in said axial bore, said tubular means having an end communicating with said internal passageway means and a portion spaced longitudinally of said one end thereof alternately communicating with said interior spaces as said hammer means approaches said alternate terminal positions and said external fluid passageway means communicating with a port of said ported passageway means to exhaust such pressure fluid through said external passageways.

2. A pressure fluid actuated drilling apparatus comprising, an elongated tubular casing having fluid passageways therein, inlet valve means at one end of said casing, a drilling element having a portion thereof captively slidably disposed in and at the other end of said casing, an elongated tube located centrally of said casing and having one end secured to said valve means and the other end slidably engaging a central opening extending through said drilling element, hammer means in said casing being reciprocable in opposite directions relative to said casing and slidable on said tube, certain of said fluid passageways communicating between said valve means and the interior of said casing, said valve means being actuated by fluid pressure from said passageways upon said hammer means reaching a terminal position to cause reciprocable movement of said hammer means, other of said fluid passageways communicating with the interior of said casing at certain hammer positions for permitting flow of exhaust fluid, said tube having ports therethrough for connecting the interior of said casing with the interior of said tube at certain positions of said hammer means, said drilling element being connected to said casing to form a plurality of fluid passageways in communication with said other fluid passageways for permitting exhaust of fluid around the outer periphery of said drilling element wherein the exhaust of fluid through said tube through said central opening in said drilling element and through said plurality of fluid passageways occurs simultaneously and intermittently in response to the reciprocation of said hammer means.

3. A pressure fluid actuated mechanism for forming holes in geological formations comprising, an elongated tubular body, a drilling element captively slidably carried at one end of said body, flapper valve means carried at the other end of said body, elongated hammer means in and slidably engaging the interior of said body being located between said drilling element and said valve means, a plurality of fluid passageways in said body being communicable with said valve means, said valve means being alternately operable to supply pressure fluid to interior spaces defined in part by opposite longitudinally spaced surfaces of said hammer means for reciprocating said hammer means in said body, port means in said body for exhausting pressure fluid from said interior spaces alternately, said hammer means having an axial bore therethrough; elongated tubular means extending axially from said drilling element and from said valve means slideably received in said axial bore, said tubular means having one portion communicating internally with an internal passageway in said drilling element and another portion alternately communicating externally with said interior spaces as said hammer means approaches alternate terminal positions for exhausting spent pressure fluid, and at least one external passageway formed between said tubular body and said drilling element communicating with said port means for exhausting spent pressure fluid.

4. A pressure fluid actuated mechanism comprising: a body defining an elongated chamber having an open end and a closed end; an elongated tube having one end at least adjacent to said closed end, said tube being centrally located in and extending longitudinally of said elongated chamber toward said open end and having the other end inwardly adjacent said open end; said tube having longitudinally spaced tube ports communicating between said chamber and the interior of said tube; an elongated drilling element captively longitudinally slidably positioned in said open end of said body and having a portion outwardly extending therefrom, said drilling element having a central longitudinal opening therein slidably receiving said other end of said tube, said central opening communicating with the interior of said tube and with the exterior of said outwardly extending portion; an elongated hammer element slidably received within said chamber and upon the exterior surface of said tube and reciprocated in said chamber by pressure fluid alternately supplied to and exhausted from a first chamber portion defined in part by one end of said hammer element and said closed end and a second chamber portion defined in part by the opposite end of said hammer element and said drilling element, respectively; valve means communicating with said chamber portions to supply pressure fluid alternately thereto in response to such reciprocation; a plurality of body passageways in said body communicating with a plurality of other passageways formed between the interior of said open end and the exterior periphery of said drilling element; longitudinally spaced body ports formed in said body and communicating between respective ones of said chamber portions and said body passageways, the communication of said chamber portions with said tube ports and said body ports being so controlled by the reciprocation of said hammer element that all of the said ports communicating with one of said chamber portions are open while the remaining ones of said ports are closed when the hammer element is in a given position.

5. A pressure fluid operated mechanism as specified in claim 4 wherein said drilling element is longitudinally slidable between an inwardly retracted drilling and an outwardly extended non-drilling position and wherein positioning of said drilling element in said non-drilling position blocks the communication of said body passageways with said outer passageways.

References Cited by the Examiner
UNITED STATES PATENTS

| | | | |
|---|---|---|---|
| 917,242 | 4/1909 | Boyer | 173—15 |
| 1,107,550 | 8/1914 | Robertson | 173—16 |
| 1,382,775 | 6/1921 | Gilman | 173—18 |
| 1,846,804 | 2/1932 | Hansen | 173—17 |
| 2,572,841 | 10/1951 | Osgood et al. | 173—65 |
| 2,887,989 | 5/1959 | Dulaney | 173—17 X |
| 2,955,573 | 10/1960 | Feucht | 173—59 |
| 3,051,134 | 8/1962 | Lincoln | 173—103 |
| 3,105,559 | 10/1963 | Collier et al. | 173—15 |

MILTON KAUFMAN, *Primary Examiner.*

BROUGHTON G. DURHAM, *Examiner.*